(12) United States Patent
Cai

(10) Patent No.: US 11,159,196 B1
(45) Date of Patent: Oct. 26, 2021

(54) GATE DRIVER ON ARRAY CIRCUIT

(71) Applicant: Shenzhen China Star Optoelectronics Semiconductor Display Technology Co., Ltd., Shenzhen (CN)

(72) Inventor: Zhenfei Cai, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 180 days.

(21) Appl. No.: 16/627,802

(22) PCT Filed: Dec. 16, 2019

(86) PCT No.: PCT/CN2019/125551
§ 371 (c)(1),
(2) Date: Dec. 31, 2019

(87) PCT Pub. No.: WO2021/109219
PCT Pub. Date: Jun. 10, 2021

(30) Foreign Application Priority Data

Dec. 5, 2019 (CN) .......................... 201911238064.4

(51) Int. Cl.
*H04L 25/03* (2006.01)
*H04B 1/48* (2006.01)
*H04B 10/27* (2013.01)
*H04B 10/40* (2013.01)

(52) U.S. Cl.
CPC ............... *H04B 1/48* (2013.01); *H04B 10/27* (2013.01); *H04B 10/40* (2013.01); *H04L 25/03159* (2013.01); *H04B 2210/006* (2013.01); *H04L 2025/03426* (2013.01)

(58) Field of Classification Search
CPC .......... H04B 1/48; H04B 10/27; H04B 10/40; H04B 2210/006; H04L 25/03159
USPC .......................................................... 398/115
See application file for complete search history.

(56) References Cited

U.S. PATENT DOCUMENTS

| 10,027,325 | B1 | 7/2018 | Graves |
| 2013/0063331 | A1 | 3/2013 | Kim et al. |
| 2016/0163401 | A1 | 6/2016 | Nonaka |
| 2016/0217728 | A1 | 7/2016 | In et al. |
| 2017/0301302 | A1* | 10/2017 | Zhao ........................ G09G 3/36 |
| 2018/0068628 | A1* | 3/2018 | Xiao ..................... G09G 3/3677 |
| 2018/0151143 | A1 | 5/2018 | Kim |

(Continued)

FOREIGN PATENT DOCUMENTS

| CN | 105679224 | 6/2016 |
| CN | 105957485 | 9/2016 |

(Continued)

*Primary Examiner* — Ted M Wang

(57) ABSTRACT

The present disclosure provides a gate driver on array (GOA) circuit, including a plurality of cascaded GOA circuit units. The GOA circuit of the present disclosure changes drains of T7 and T9 to DC VDD and adds T11 and T12 between Q1 and T7 and T9, which can eliminate an effect to Q1. When CLK1 and CLK2 are high, T11 and T12 are turned on, and Vg (n) and Vg (n+1) output high electrical potential. In the meantime, bootstrap capacitors C3 and C4 are added. When CLK is high, gates of T7 and T9 are pulled up to ensure lossless output of VDD. Therefore, an influence to Q1 when pulling down one row is eliminated. In the meantime, addition of bootstrap capacitors further ensures lossless output of T7 and T9.

10 Claims, 2 Drawing Sheets

(56) References Cited

U.S. PATENT DOCUMENTS

2018/0218696 A1 8/2018 Du
2019/0295673 A1 9/2019 Umezaki

FOREIGN PATENT DOCUMENTS

| CN | 108154901 | 6/2018 |
| CN | 108538256 | 9/2018 |
| EP | 3048602 | 7/2016 |
| JP | 2019-075188 | 5/2019 |

\* cited by examiner

GATE DRIVER ON ARRAY CIRCUIT

RELATED APPLICATIONS

This application is a National Phase of PCT Patent Application No. PCT/CN2019/125551 having International filing date of Dec. 16, 2019, which claims the benefit of priority of Chinese Patent Application No. 201911238064.4 filed on Dec. 5, 2019. The contents of the above applications are all incorporated by reference as if fully set forth herein in their entirety.

FIELD AND BACKGROUND OF THE INVENTION

The present disclosure relates to the field of display technologies, and more particularly, to a GOA circuit.

Gate driver on array (GOA) technology uses current thin film transistor liquid crystal display array manufacturing process to manufacture a gate line scanning drive signal circuit on an array substrate, to achieve gate driving of progressive scanning.

As shown in FIG. 1 and FIG. 2, a common GOA circuit of node Q1 in a narrow bezel design of the prior art is implemented, wherein the nth and n+1th rows of gates share the Q1 node of one GOA unit. When CLK1 is high, the nth row of Vg (n) outputs high electrical potential; when CLK2 is high, the n+1th row of Vg (n+1) outputs high electrical potential; when sharing the node Q1, time of the high electrical potential of CLK1 and CLK2 need to be staggered (as shown in FIG. 2). Therefore, a holding time of the voltage of the node Q1 needs to be doubled. On the one hand, the node Q1 is susceptible to leakage caused by threshold voltage drifts such as T2/T6. On the other hand, when ending the Vg (n) output and pulling down T8, the node Q1 will be affected by C1 coupling because the C1 coupling forms a pull-down resistor, which further pulls down the voltage of the node Q1. When CLK2 is high, T9 cannot be fully turned on because the voltage of the node Q1 is also high, eventually causing failure of Vg (n+1) to output normally.

Therefore, it is urgent to provide a new GOA circuit, which can realize the normal output of Vg (n+1).

SUMMARY OF THE INVENTION

The purpose of the present disclosure is to provide a GOA circuit, which can eliminate the influence to the node Q1 when pulling down one row, and adding the bootstrap capacitor to further ensure T7 and T9 output lossless.

The present disclosure provides a GOA circuit, which includes a gate of a first thin film transistor (T1) connected to a signal output point Vg (n−1) of a n−1 stage GOA circuit unit, a drain of the first thin film transistor (T1) connected to a gate of a fifth thin film transistor (T5), a source of the first thin film transistor (T1) connected to a drain of a second thin film transistor (T2); a gate of the second thin film transistor (T2) connected to a signal output point Vg (n−2) of a n+2 stage GOA circuit unit, a source of the second thin film transistor (T2) connected to a constant voltage low electrical potential (VGL); a gate of a third thin film transistor (T3) connected to a constant voltage high electrical potential (VGH), a drain of the third thin film transistor (T3) connected to the constant voltage high electrical potential (VGH), and a source of the third thin film transistor (T3) connected to a second node (Qb); a gate of a fourth thin film transistor (T4) connected to a first node (Q1), a drain of the fourth thin film transistor (T4) connected to the second node (Qb), and a source of the fourth thin film transistor (T4) connected to the constant voltage low electrical potential (VGL); a drain of the fifth thin film transistor (T5) connected to the second node (Qb), and a source of the fifth thin film transistor (T5) connected to the constant voltage low electrical potential (VGL); a gate of a sixth thin film transistor (T6) connected to the second node (Qb), a drain of the sixth thin film transistor (T6) connected to the first node (Q1), and a source of the sixth thin film transistor (T6) connected to a source of a eighth thin film transistor (T8); a gate of a seventh thin film transistor (T7) connected to a drain of an eleventh thin film transistor (T11), a drain of the seventh thin film transistor (T7) connected to a constant voltage source (VDD), and a source of the seventh thin film transistor (T7) connected to a drain of an eighth thin film transistor (T8); a gate of the eighth thin film transistor (T8) connected to the second node (Qb); a gate of the eleventh thin film transistor (T11) receives a first clock signal (CLK1), a source of the eleventh thin film transistor (T11) connected to the first node (Q1); a terminal of a first capacitor (C1) connected to a third capacitor (C3), and another terminal of the first capacitor (C1) connected to a signal output point Vg(n) of the n stage GOA circuit unit; a terminal of the third capacitor (C3) connected to the gate of the eleventh thin film transistor (T11), and another terminal of the third capacitor (C3) connected to the first capacitor (C1); a gate of a ninth thin film transistor (T9) connected to a drain of a twelfth thin film transistor (T12), a drain of the ninth thin film transistor (T9) connected to the constant voltage source (VDD), and a source of the ninth thin film transistor (T9) connected to a drain of a tenth thin film transistor (T10); a gate of the tenth thin film transistor (T10) connected to the second node (Qb), and a source of the tenth thin film transistor (T10) connected to the constant voltage low electrical potential (VGL); a gate of the twelfth thin film transistor (T12) receives a second clock signal (CLK2), and a source of the twelfth thin film transistor (T12) connected to the first node (Q1); a terminal of a second capacitor (C2) connected to a fourth capacitor (C4), and another terminal of the second capacitor (C2) connected to a signal output point Vg(n+1) of a n+1 stage GOA circuit unit; and a terminal of the fourth capacitor (C4) connected to the second capacitor (C2), and another terminal of the fourth capacitor (C4) connected to the gate of the twelfth thin film transistor (T12).

Further, the first clock signal (CLK1) and the second clock signal (CLK2) are rectangular waves having 0.5 duty cycle, and there is no phase difference between the first clock signal (CLK1) and the second clock signal (CLK 2).

Further, for a first stage GOA circuit unit, when starting a forward scanning, a signal output point Vg (n) of a n−1 stage GOA circuit unit receives a high electrical potential signal as a starting signal.

Further, for a first stage GOA circuit unit, when starting a forward scanning, a signal output point Vg (n) of a n−1 stage GOA circuit unit receives a high electrical potential signal as a starting signal.

Further, for a second stage GOA circuit unit, when starting a forward scanning, a signal output point Vg (n+1) of the n+2 stage GOA circuit unit receives a high electrical potential signal as a starting signal.

Further, for a last one stage GOA circuit unit, when starting a reverse scanning, a signal output point Vg (n+1) of the n+2 stage GOA circuit unit receives a high electrical potential signal as a starting signal.

Further, for a penultimate stage GOA circuit unit, when starting a reverse scanning, a signal output point Vg (n) of a n−1 stage GOA circuit unit receives a high electrical potential signal as a starting signal.

Further, the GOA circuit is a GOA circuit of a low temperature poly silicon (LTPS) panel.

Further, the GOA circuit is a GOA circuit of an organic light emitting diode (OLED) panel.

Further, the first thin film transistor (T1), the second thin film transistor (T2), the third thin film transistor (T3), the fourth thin film transistor (T4), the fifth thin film transistor (T5), the sixth thin film transistor (T6), the seventh thin film transistor (T7), the eighth thin film transistor (T8), the ninth thin film transistor (T9), the tenth thin film transistor (T10), the eleventh thin film transistor (T11), and the twelfth thin film transistor (T12) are all p-type thin film transistors or n-type thin film transistors.

Further, the signal output point Vg(n) of the n stage GOA circuit unit is connected to a scanning line corresponding to the n stage GOA circuit unit; the signal output point Vg(n+1) of the n+1 stage GOA circuit unit connected to a scanning line corresponding to the n+1 stage GOA circuit unit.

The present disclosure provides a GOA circuit. The GOA circuit of the present disclosure changes drains of T7 and T9 to DC VDD and adds T11 and T12 between Q1 and T7 and T9, which can eliminate an effect to Q1. When CLK1 and CLK2 are high, T11 and T12 are turned on, and Vg (n) and Vg (n+1) output high electrical potential. In the meantime, bootstrap capacitors C3 and C4 are added. When CLK is high, gates of T7 and T9 are pulled up to ensure lossless output of VDD. Therefore, an influence to Q1 when pulling down one row is eliminated. In the meantime, addition of bootstrap capacitors further ensures lossless output of T7 and T9.

DESCRIPTION OF SPECIFIC EMBODIMENTS OF THE INVENTION

The present disclosure provides a physical keyboard input system, keyboard input method, and storage medium. To make the purpose, technical solution, and effect of this application clearer and more specific, the present disclosure is described in detail below regarding the accompanying figures and embodiments. It should be understood the specific embodiments described herein only explain the present disclosure, and are not limit the present disclosure.

The present disclosure provides a GOA circuit, which includes a plurality of cascaded GOA circuit units, and the GOA circuit is a GOA circuit of an LTPS panel. In other embodiments, it is a GOA circuit of an OLED panel.

Figure 1:
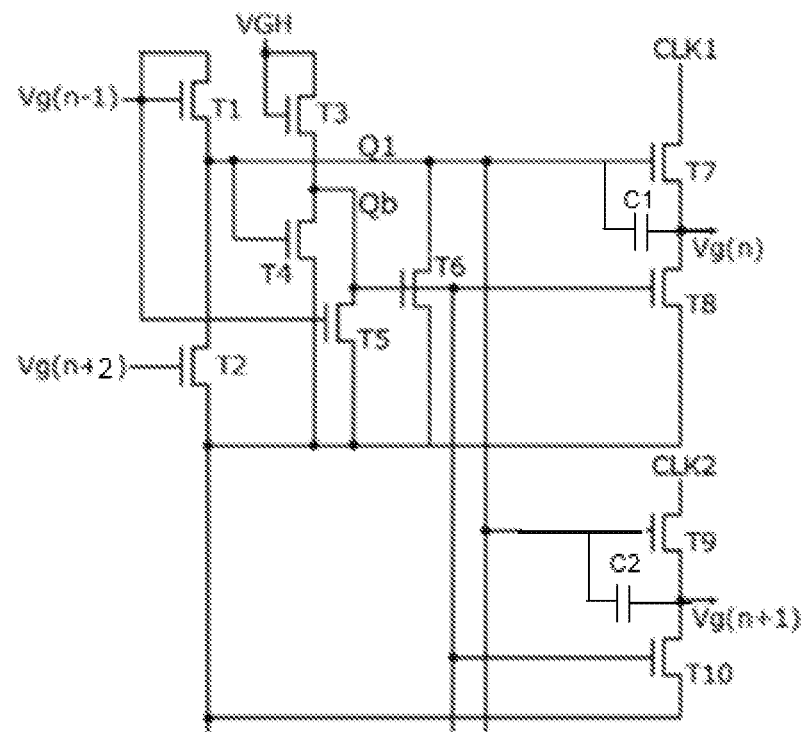
FIG. 1 is a circuit diagram of a prior art GOA circuit.
Figure 2:
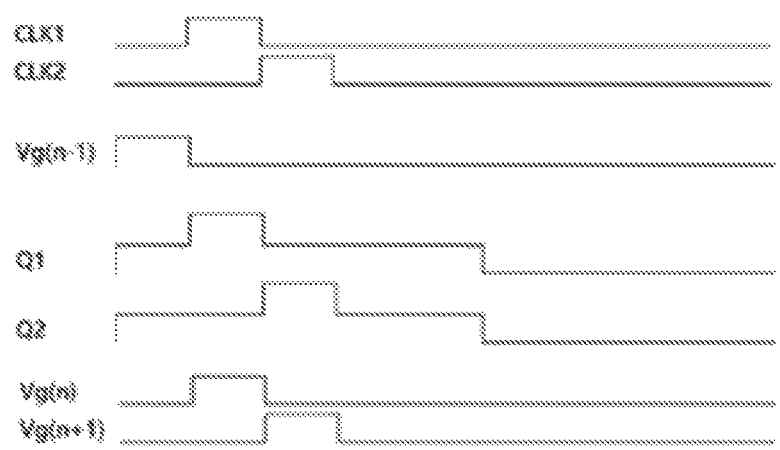
FIG. 2 is a timing diagram of the prior art GOA circuit.
Figure 3:
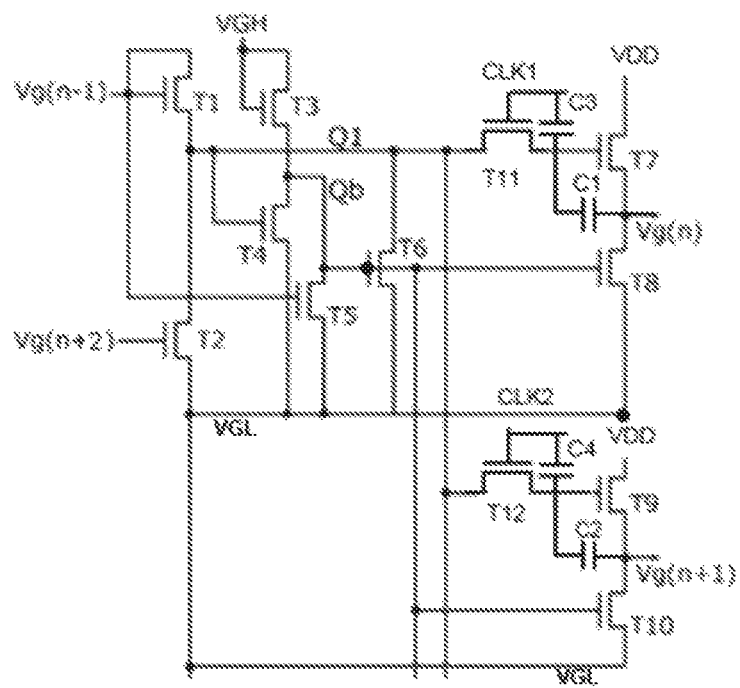
FIG. 3 is a circuit diagram of a GOA circuit provided by the present disclosure.

As shown in FIG. 3, an nth stage GOA circuit unit includes a gate of a first thin film transistor (T1) connected to a signal output point Vg (n−1) of an n−1th stage GOA circuit unit, a drain of the first thin film transistor (T1) connected to a gate of a fifth thin film transistor (T5), and a source of the first thin film transistor (T1) connected to a drain of a second thin film transistor (T2).

A gate of the second thin film transistor (T2) is connected to a signal output point Vg (n−2) of an n+2th stage GOA circuit unit, and a source of the second thin film transistor (T2) is connected to a constant voltage low electrical potential (VGL).

A gate of a third thin film transistor (T3) is connected to a constant voltage high electrical potential (VGH), a drain of the third thin film transistor (T3) is connected to the constant voltage high electrical potential (VGH), and a source of the third thin film transistor (T3) is connected to a second node (Qb).

A gate of a fourth thin film transistor (T4) is connected to a first node (Q1), a drain of the fourth thin film transistor (T4) is connected to the second node (Qb), and a source of the fourth thin film transistor (T4) is connected to the constant voltage low electrical potential (VGL).

A drain of the fifth thin film transistor (T5) is connected to the second node (Qb), and a source of the fifth thin film transistor (T5) is connected to the constant voltage low electrical potential (VGL).

A gate of a sixth thin film transistor (T6) is connected to the second node (Qb), a drain of the sixth thin film transistor (T6) is connected to the first node (Q1), and a source of the sixth thin film transistor (T6) is connected to a source of an eighth thin film transistor (T8).

A gate of a seventh thin film transistor (T7) is connected to a drain of an eleventh thin film transistor (T11), a drain of the seventh thin film transistor (T7) is connected to a constant voltage source (VDD), and a source of the seventh thin film transistor (T7) is connected to a drain of the eighth thin film transistor (T8).

A gate of the eighth thin film transistor (T8) is connected to the second node (Qb).

Agate of the eleventh thin film transistor (T11) receives a first clock signal (CLK1), and a source of the eleventh thin film transistor (T11) is connected to the first node (Q1).

A terminal of a first capacitor (C1) is connected to a third capacitor (C3), and another terminal of the first capacitor (C1) is connected to a signal output point Vg (n) of the nth stage GOA circuit unit.

A terminal of the third capacitor (C3) is connected to the gate of the eleventh thin film transistor (T11), and another terminal of the third capacitor (C3) is connected to the first capacitor (C1).

A gate of a ninth thin film transistor (T9) is connected to a drain of a twelfth thin film transistor (T12), a drain of the ninth thin film transistor (T9) is connected to the constant voltage source (VDD), and a source of the ninth thin film transistor (T9) is connected to a drain of a tenth thin film transistor (T10).

A gate of the tenth thin film transistor (T10) is connected to the second node (Qb), and a source of the tenth thin film transistor (T10) is connected to the constant voltage low electrical potential (VGL).

A gate of the twelfth thin film transistor (T12) receives a second clock signal (CLK2), and a source of the twelfth thin film transistor (T12) is connected to the first node (Q1).

A terminal of a second capacitor (C2) is connected to a fourth capacitor (C4), and another terminal of the second capacitor (C2) is connected to a signal output point Vg (n+1) of an n+1th stage GOA circuit unit. A terminal of the fourth capacitor (C4) is connected to the second capacitor (C2), and another terminal of the fourth capacitor (C4) is connected to the gate of the twelfth thin film transistor (T12).

For a first stage GOA circuit unit, when starting a forward scanning, a signal output point Vg (n) of an n−1th stage GOA circuit unit inputs a high electrical potential signal as a starting signal. For a second stage GOA circuit unit, when starting a forward scanning, a signal output point Vg (n+1)

of an n+2th stage GOA circuit unit inputs a high electrical potential signal as a starting signal For a last stage GOA circuit unit, when starting a reverse scanning, the signal output point Vg (n+1) of the n+2th stage GOA circuit unit inputs a high electrical potential signal as a starting signal. For a second to last stage GOA circuit unit, when starting a reverse scanning, the signal output point Vg (n) of the n−1th stage GOA circuit unit inputs a high electrical potential signal as a starting signal As shown in FIG. 4, the first clock signal (CLK1) and the second clock signal (CLK2) are rectangular waves having one duty cycle, and there is no phase difference between the first clock signal (CLK1) and the second clock signal (CLK2).

Figure 4:
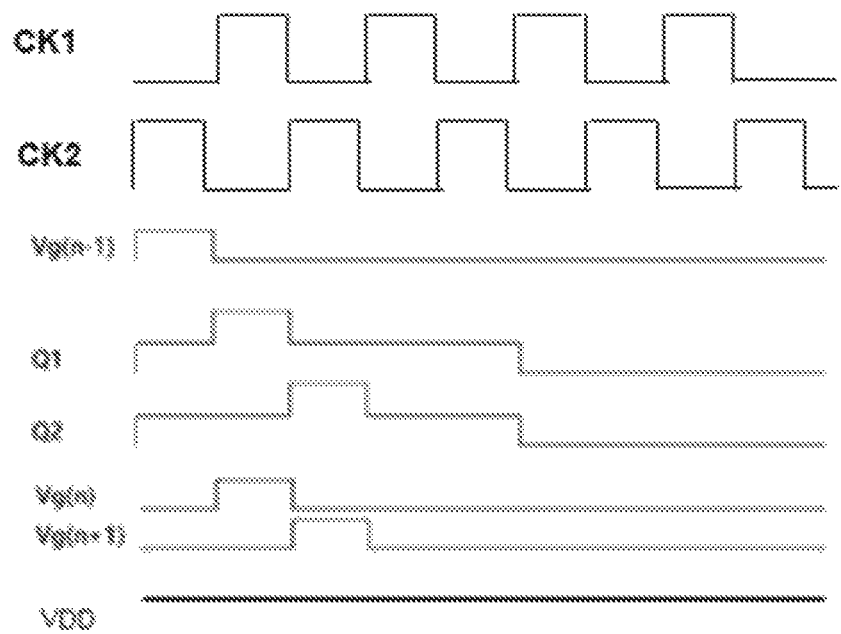
FIG. 4 is a timing diagram of the GOA circuit provided by the present disclosure.

It can be seen from FIG. 4 that the Vg (n+1) can follow the Vg (n) output normally, thereby preventing a situation in which output cannot be achieved.

The signal output point Vg (n) of the nth stage GOA circuit unit is connected to a scanning line corresponding to the nth stage GOA circuit unit; the signal output point Vg (n+1) of the n+1th stage GOA circuit unit is connected to a scanning line corresponding to the n+1th stage GOA circuit unit.

The specific operating process of forward scanning of the circuit is described below with FIG. 4:

Step 1: Charging Q1; when Vg (n−1) output is high, turning on the second thin film transistor (T2) due to a diode connection, charging Q1 to a high electrical potential, and registering high electrical potential of Q1.

Step 2: When CLK1 is at a high electrical potential, turning on T11, and inputting the voltage of Q1 to the gate of T7. At the same time, pulling up the gate of T7 to a high electrical potential by a bootstrap of C3, turning on T7, and Vg (n) outputting at high electrical potential; when the output of this line is completed, turning on T8; when pulling down the Vg (n), CLK1 is at a low electrical potential due to the gate of T11, and turning off T11 so the pulling down will not affect the electrical potential of Q1.

Step 3: When CLK2 is at a high electrical potential, turning on T12, and inputting the voltage of Q1 to the gate of T9. At the same time, pulling up a gate of T9 to a high electrical potential by the C4 bootstrap, and turning on T9 and Vg (n+1) outputting at high electrical potential. When the output of this line is completed, turning on T10; when pulling down Vg (n+1), CLK2 is at a low electrical potential due to the gate of T12, and turning off T12 so the pulling down will not affect the electrical potential of Q1.

The thin film transistors mentioned in the present disclosure are all P-type thin film transistors or N-type thin film transistors.

The present disclosure provides a gate driver on array (GOA) circuit, including a plurality of cascaded GOA circuit units. The GOA circuit of the present disclosure changes drains of T7 and T9 to DC VDD and adds T11 and T12 between Q1 and T7 and T9, which can eliminate an effect to Q1. When CLK1 and CLK2 are high, T11 and T12 are turned on, and Vg (n) and Vg (n+1) output high electrical potential. In the meantime, bootstrap capacitors C3 and C4 are added. When CLK is high, gates of T7 and T9 are pulled up to ensure lossless output of VDD. Therefore, an influence to Q1 when pulling down one row is eliminated. In the meantime, addition of bootstrap capacitors further ensures lossless output of T7 and T9.

The embodiments of the present disclosure have been described above with reference to the accompanying figures, but the present disclosure is not limited to the above specific implementations, and the above specific implementations are merely for schematic, not restrictive. People skilled in the art may, under the inspiration of the present disclosure, make many modifications without departing from the spirit of the present disclosure and the scope of protection of the claims, which all fall within the protection of the present disclosure.

What is claimed is:

1. A gate driver on array (GOA) circuit comprising a plurality of cascaded GOA circuit units, wherein an nth stage GOA circuit unit comprises:

a gate of a first thin film transistor (T1) connected to a signal output point Vg (n−1) of an n−1th stage GOA circuit unit, a drain of the first thin film transistor (T1) connected to a gate of a fifth thin film transistor (T5), and a source of the first thin film transistor (T1) connected to a drain of a second thin film transistor (T2);

a gate of the second thin film transistor (T2) connected to a signal output point Vg (n−2) of an n+2th stage GOA circuit unit, and a source of the second thin film transistor (T2) connected to a constant voltage low electrical potential (VGL);

a gate of a third thin film transistor (T3) connected to a constant voltage high electrical potential (VGH), a drain of the third thin film transistor (T3) connected to the constant voltage high electrical potential (VGH), and a source of the third thin film transistor (T3) connected to a second node (Qb);

a gate of a fourth thin film transistor (T4) connected to a first node (Q1), a drain of the fourth thin film transistor (T4) connected to the second node (Qb), and a source of the fourth thin film transistor (T4) connected to the constant voltage low electrical potential (VGL);

a drain of the fifth thin film transistor (T5) connected to the second node (Qb), and a source of the fifth thin film transistor (T5) connected to the constant voltage low electrical potential (VGL);

a gate of a sixth thin film transistor (T6) connected to the second node (Qb), a drain of the sixth thin film transistor (T6) connected to the first node (Q1), and a source of the sixth thin film transistor (T6) connected to a source of an eighth thin film transistor (T8);

a gate of a seventh thin film transistor (T7) connected to a drain of an eleventh thin film transistor (T11), a drain of the seventh thin film transistor (T7) connected to a constant voltage source (VDD), and a source of the seventh thin film transistor (T7) connected to a drain of the eighth thin film transistor (T8);

a gate of the eighth thin film transistor (T8) connected to the second node (Qb);

a gate of the eleventh thin film transistor (T11) which inputs a first clock signal (CLK1), and a source of the eleventh thin film transistor (T11) connected to the first node (Q1);

a terminal of a first capacitor (C1) connected to a third capacitor (C3), and another terminal of the first capacitor (C1) connected to a signal output point Vg (n) of the nth stage GOA circuit unit;

a terminal of the third capacitor (C3) connected to the gate of the eleventh thin film transistor (T11), and another terminal of the third capacitor (C3) connected to the first capacitor (C1);

a gate of a ninth thin film transistor (T9) connected to a drain of a twelfth thin film transistor (T12), a drain of the ninth thin film transistor (T9) connected to the constant voltage source (VDD), and a source of the ninth thin film transistor (T9) connected to a drain of a tenth thin film transistor (T10);

a gate of the tenth thin film transistor (T10) connected to the second node (Qb), and a source of the tenth thin film transistor (T10) connected to the constant voltage low electrical potential (VGL);

a gate of the twelfth thin film transistor (T12) which inputs a second clock signal (CLK2), and a source of the twelfth thin film transistor (T12) connected to the first node (Q1);

a terminal of a second capacitor (C2) connected to a fourth capacitor (C4), and another terminal of the second capacitor (C2) connected to a signal output point Vg (n+1) of an n+1th stage GOA circuit unit; and a terminal of the fourth capacitor (C4) connected to the second capacitor (C2), and another terminal of the fourth capacitor (C4) connected to the gate of the twelfth thin film transistor (T12).

2. The GOA circuit as claimed in claim 1, wherein the first clock signal (CLK1) and the second clock signal (CLK2) are rectangular waves having 0.5 duty cycle, and there is no phase difference between the first clock signal (CLK1) and the second clock signal (CLK2).

3. The GOA circuit as claimed in claim 1, wherein for a first stage GOA circuit unit, when starting a forward scanning, a signal output point Vg (n) of a n−1th stage GOA circuit unit inputs a high electrical potential signal as a starting signal.

4. The GOA circuit as claimed in claim 1, wherein for a second stage GOA circuit unit, when starting a forward scanning, a signal output point Vg (n+1) of the n+2th stage GOA circuit unit inputs a high electrical potential signal as a starting signal.

5. The GOA circuit as claimed in claim 1, wherein for a last stage GOA circuit unit, when starting a reverse scanning, a signal output point Vg (n+1) of the n+2th stage GOA circuit unit inputs a high electrical potential signal as a starting signal.

6. The GOA circuit as claimed in claim 1, wherein for a second to last stage GOA circuit unit, when starting a reverse scanning, a signal output point Vg (n) of the n−1th stage GOA circuit unit inputs a high electrical potential signal as a starting signal.

7. The GOA circuit as claimed in claim 1, wherein the GOA circuit is a GOA circuit of a low temperature polysilicon (LTPS) panel.

8. The GOA circuit as claimed in claim 1, wherein the GOA circuit is a GOA circuit of an organic light emitting diode (OLED) panel.

9. The GOA circuit as claimed in claim 1, wherein the first thin film transistor (T1), the second thin film transistor (T2), the third thin film transistor (T3), the fourth thin film transistor (T4), the fifth thin film transistor (T5), the sixth thin film transistor (T6), the seventh thin film transistor (T7), the eighth thin film transistor (T8), the ninth thin film transistor (T9), the tenth thin film transistor (T10), the eleventh thin film transistor (T11), and the twelfth thin film transistor (T12) are all P-type thin film transistors or N-type thin film transistors.

10. The GOA circuit as claimed in claim 1, wherein the signal output point Vg (n) of the nth stage GOA circuit unit is connected to a scanning line corresponding to the nth stage GOA circuit unit, and the signal output point Vg (n+1) of the n+1th stage GOA circuit unit is connected to a scanning line corresponding to the n+1th stage GOA circuit unit.

* * * * *